United States Patent
Tuladhar et al.

(10) Patent No.: US 8,738,436 B2
(45) Date of Patent: May 27, 2014

(54) CLICK THROUGH RATE PREDICTION SYSTEM AND METHOD

(75) Inventors: Looja Tuladhar, Sunnyvale, CA (US); Manish Satyapal Gupta, Bangalore Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 1107 days.

(21) Appl. No.: 12/241,815

(22) Filed: Sep. 30, 2008

(65) Prior Publication Data

US 2010/0082421 A1  Apr. 1, 2010

(51) Int. Cl.
*G06Q 30/00* (2012.01)
*G06Q 10/00* (2012.01)

(52) U.S. Cl.
USPC ............... 705/14.4; 705/14.41; 705/14.52; 705/14.6; 705/14.69; 705/7.11

(58) Field of Classification Search
USPC .............................. 705/14.1–14.73
See application file for complete search history.

(56) References Cited

U.S. PATENT DOCUMENTS

| | | | |
|---|---|---|---|
| 6,272,507 B1* | 8/2001 | Pirolli et al. | 715/206 |
| 6,990,628 B1* | 1/2006 | Palmer et al. | 715/234 |
| 2004/0054572 A1* | 3/2004 | Oldale et al. | 705/10 |
| 2005/0165766 A1* | 7/2005 | Szabo | 707/3 |
| 2006/0095336 A1* | 5/2006 | Heckerman et al. | 705/26 |
| 2006/0294068 A1* | 12/2006 | Li et al. | 707/3 |
| 2007/0005568 A1* | 1/2007 | Angelo et al. | 707/3 |
| 2007/0118432 A1* | 5/2007 | Vazirani et al. | 705/26 |
| 2007/0156677 A1* | 7/2007 | Szabo | 707/5 |
| 2007/0162379 A1* | 7/2007 | Skinner | 705/37 |
| 2007/0174114 A1 | 7/2007 | Bigby et al. | |
| 2008/0004962 A1* | 1/2008 | Muthukrishnan et al. | 705/14 |
| 2008/0189179 A1 | 8/2008 | Marouani et al. | |
| 2008/0256064 A1* | 10/2008 | Grois | 707/5 |
| 2008/0301116 A1* | 12/2008 | Wang et al. | 707/5 |
| 2009/0124241 A1* | 5/2009 | Krishnaswamy et al. | 455/414.2 |

* cited by examiner

*Primary Examiner* — Ig T An
(74) *Attorney, Agent, or Firm* — Mauriel Kapouytian Woods LLP

(57) ABSTRACT

A computer implemented method comprises analyzing a plurality of attributes of a sample of online documents using a boosted decision tree and generating a model from it. The model is used to predict a click through rate (CTR) of an additional online document based on the analyzing. The predicted CTR is output to a display device, storage medium or network.

11 Claims, 7 Drawing Sheets

CLICK THROUGH RATE PREDICTION SYSTEM AND METHOD

FIELD OF THE INVENTION

The present invention relates to online document and e-commerce systems and methods.

BACKGROUND

Click-through-rate is an important parameter for online advertising, and is one of the more frequently used measures of the success of an online advertising campaign. A CTR provides a measure of ad effectiveness in terms of user response to the ad. One measure of CTR is obtained by dividing the number of users who clicked on an ad on a web page by the number of times the ad was delivered (impressions). For example, if an ad was rendered 1000 times (impressions delivered) and 7 people clicked on it (clicks recorded), then the resulting CTR would be 0.7 percent.

CTR provides a tool for online advertising service providers to use in setting their cost-per-click contract fee structures, as well as a tool for the advertisers to plan their advertising and sales. CTR impacts publisher's revenue in "pay for performance" business model.

The CTR can be computed as the ratio of "clicks to get a full description of the entity" to "views of a reduced version (snippets, listings, thumbnails) of the entity". This "true" CTR can be calculated after a large number of impressions have been rendered for an advertisement campaign across a representative cross section of the conditions to be encountered throughout the campaign. Prior to commencing the campaign, this true CTR information is not known. Similarly, in the initial stages of the introduction of the entity, the impressions (views) and the clicks are too low to produce a Maximum likelihood estimate (i.e. CTR) using this simple ratio with good confidence.

Estimating CTR before conducting an advertising campaign can help the publisher to set reasonable expectations for the campaign and optimize their plans. This may become problematic if the entity (e.g., a job listing) has a low shelf life.

Richardson et al., "Predicting Clicks: Estimating the Click-Through Rate for New Ads," International World Wide Web Conference Committee, May 8-12, 2007, Banff, Alberta, Canada, states that it is most beneficial for the search engine to place best performing ads first, and notes that, because the probability of clicking on an ad drops so significantly with ad position, the accuracy with which its CTR is estimated can have a significant effect on revenues.

Richardson et al. identify five features of a new advertisement that can be used to predict the CTR of the ad. Richardson et al. use a logistic regression model to predict CTR based on the following factors.

(1) Appearance: Is the ad aesthetically pleasing?
(2) Attention Capture: Does the ad draw the user in?
(3) Reputation: Is the advertiser a known or reputable brand?
(4) Landing page quality.
(5) Relevance: How relevant is the ad to search query term?
Improved methods of CTR prediction are desired.

SUMMARY OF THE INVENTION

In some embodiments, a computer implemented method comprises analyzing a plurality of attributes of a sample of online documents using a boosted decision tree and generating a model therefrom. The model is used to predict a click through rate (CTR) of an additional online document based on the analyzing. The predicted CTR is output to a display device, storage medium or network.

In some embodiments, a method comprises analyzing a plurality of attributes of a sample of online job advertisements using a regression technique and generating a model therefrom. The model is used to predict a click through rate (CTR) of an additional online job advertisement based on the analyzing. The predicted CTR is output to a display device, storage medium or network.

In some embodiments, a system comprises a machine readable storage medium storing a sample of online documents. A processor is configured for analyzing a plurality of attributes of the sample of online documents using a boosted decision tree and generating a model therefrom. The processor is configured to use the model to predict a click through rate (CTR) of an additional online document based on the analyzing. The processor is configured to output the predicted CTR to a display device, storage medium or network.

In some embodiments, a system comprises a machine readable storage medium storing a sample of online job advertisements. A processor is configured for analyzing a plurality of attributes of the sample of online job advertisements using a regression technique and generating a model therefrom. The processor is configured to use the model to predict a click through rate (CTR) of an additional online job advertisement based on the analyzing. The processor is configured to output the predicted CTR to a display device, storage medium or network.

DETAILED DESCRIPTION

Figure 1:
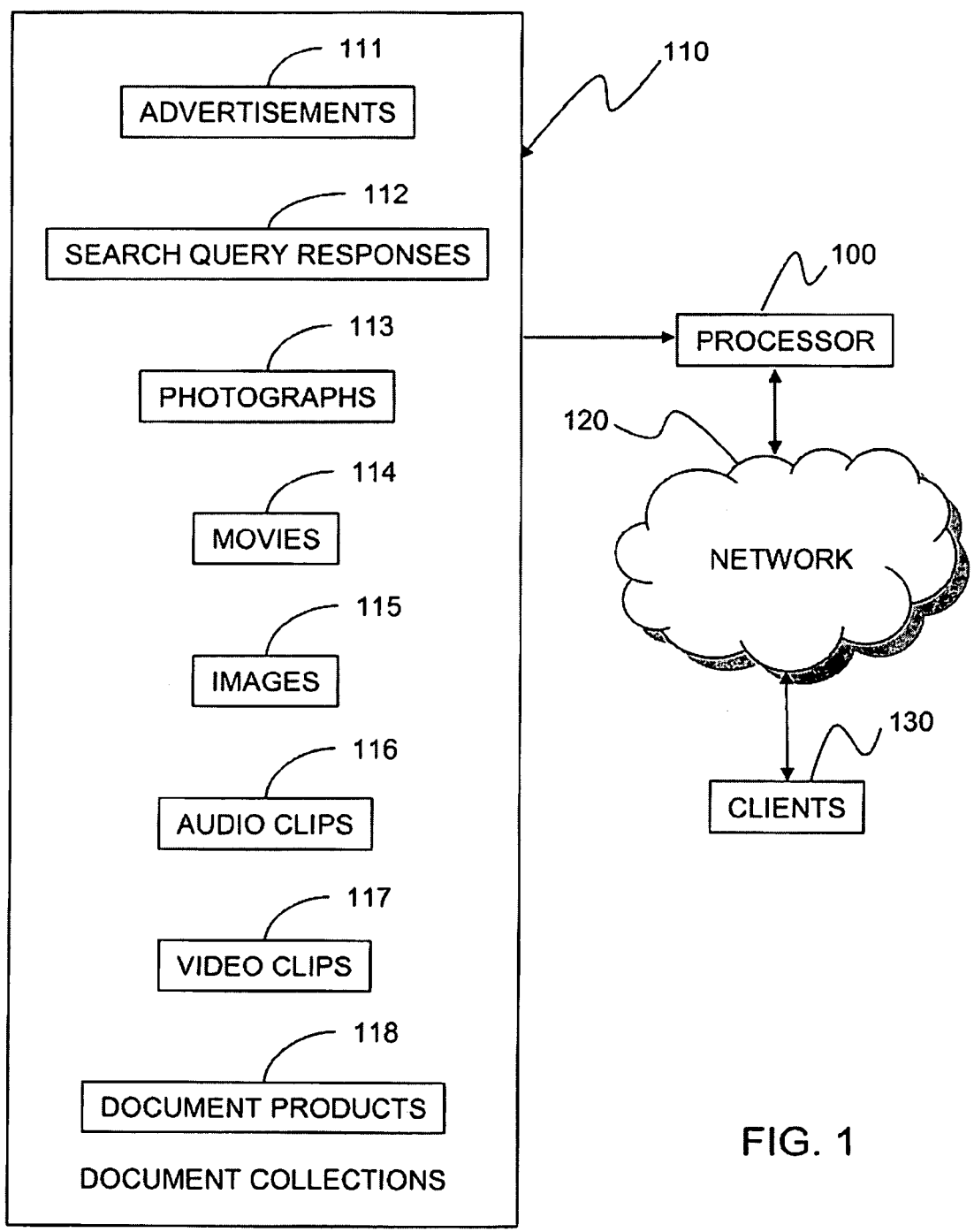
FIG. 1 is a block diagram of an exemplary system including historic data for generating a CTR model and predicting CTR for documents.

This description of the exemplary embodiments is intended to be read in connection with the accompanying drawings, which are to be considered part of the entire written description.

As used herein, the term "processor" may refer to either a single processor or a plurality of processors among which a given function may be divided and executed, sequentially, or in parallel. The term "special purpose processor" may refer to a computer processor that has been programmed with software code, or a digital signal processor implemented in application specific integrated circuitry, or a system including a combination of the two.

Click Through Rate (CTR) is an important metric for a variety of online systems, including but not limited to ad systems, job portals, and recommendation systems, for example. CTR is an MLE (Maximum Likelihood estimate)

and uses empirical click history data to provide a stable confident value. When shelf life of a product is low, CTR prediction increases in importance. Examples are described below, which can estimate the CTR using an appropriate set of features. In some embodiments, the predicted CTR is used for a job portal. Features of a job listing are identified, and a machine learning framework is provided to learn a model to predict accurately CTR of job listings. These models can potentially improve portal revenue and advertiser revenue.

The systems and methods described below provide predicted CTR estimates that can be used to rank results in a variety of applications, such as those with open-loop reporting systems. Job portals can use the predicted CTR estimates as one of the signals to rank their search results. Advertisement solutions can use predicted CTR estimate as a way of measuring the success of an online advertising campaign. Movie recommendation systems can use the predicted CTR estimates to rank the movie listings to be shown in any movie search system. Photo sharing systems can also position photos based on their predicted CTR estimates. Message boards can use the predicted CTR estimates to rank the comments. Online shopping sites can use the predicted CTR estimates to rank products in their search listings. The Predicted CTR estimates can be compared to observed trends following commencement of the campaign, to help detect click frauds.

The examples described herein provide predicted CTR estimates that are a strong indicator of relevance of an entity (job, ad, movie, photo, comment, product or the like) to the users and the overall success of the entity.

CTR of an entity depends on whether the audience is a business or consumer audience, the way of communicating about the entity to audience, how relevant it is to audience, how often the entity is publicized, use of personalization and segmentation of users while publicizing, curiosity of clickers which varies with demography, attached discounts and many other factors including the properties of the entity itself.

Some embodiments use boosted decision trees to predict CTR for documents which have few or no impressions, such as new job listings. A variety of features are selected. Information gain metrics are used to prune the features to learn a model using an appropriately sized sample (e.g., 1-month of click logs) and properties of the documents (e.g., job listings). This model is then used to predict CTR for a document (e.g., job listing), and may be used for a document with low or no click history.

Figure 7:
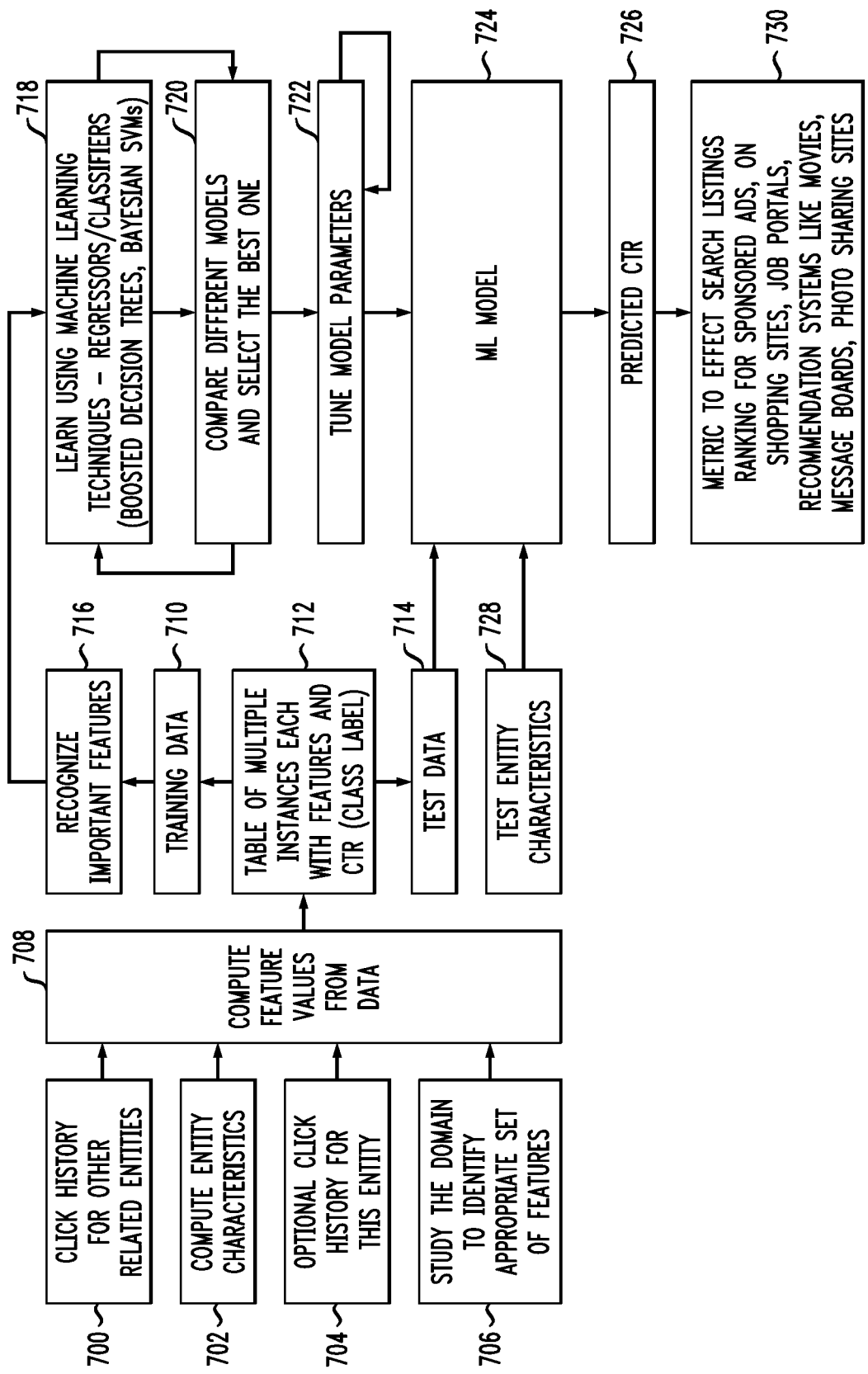
FIG. 7 is a more detailed flow chart showing CTR model generation and CTR prediction.

FIG. 7 is a diagram of a general system and method for using regression analysis to predict click through rate. The system and method can be implemented using computer program code to encode a general purpose computer to perform the illustrated method.

Block 706 is a function for studying the domain to identify appropriate features for the regression model. In some embodiments, this is performed manually. In other embodiments, this function may be automated by providing an interface for a computer system to receive information characterizing the available data and applying a set of predetermined rules to select features.

Block 704 is a database table of click history data for the entity that owns, sponsors or authored documents for which the model is developed. The table is stored in a tangible machine readable storage medium.

Block 700 is a database table of click history data for entities other than the entity that owns, sponsors or authored documents for which the model is developed. The table is stored in a tangible machine readable storage medium.

Block 702 computes entity characteristics based on the raw input data.

Block 708 computes feature values from all the data inputs 700, 702, 704 and 706, and outputs a table of instances of documents of various types, each document having a set of one or more features and a CTR value.

Block 712 is the table output by Block 708, and stored in a tangible machine readable storage medium. The data in the table are divided into two sets, 710 and 714.

Block 710 is a first subset of the data from table 712, designated for use as training data for training a regression model.

Block 714 is second subset of the data from table 712, designated for use as testing data for testing the regression model.

Block 716 is a module for recognition of important features within a given set of data. Depending on the data itself, a given attribute may be deemed more or less important assigned greater or lower weight in predicting CTR.

Block 718 is a machine learning function. Various embodiments may use any of a variety of classifiers, such as boosted decision trees, Bayesian classifiers, or software vector machines (SVM).

Block 720 shows the iterative process of comparing a plurality of classifiers and selecting the best one. In some embodiments, the final selection is a combination of a plurality of classifiers, where the weights applied to each classifier are selected to provide the best result.

Block 722 is an iterative model parameter tuning process.

Block 724 is the machine learning (ML) model output from block 722. The test data 714 are input to the ML model to test the ML model.

Block 726 is a predicted CTR value generated by the ML model based on the input entity characteristics 728 of the entity for which the CTR is to be predicted.

Block 730 shows the CTR value output to effect search listings, rankings for sponsored ads, on shopping sites, job portals, recommendation systems, photo sharing sites or the like.

FIG. 1 is a block diagram of one embodiment of a system for generating a CTR model. The system includes a database 110 containing data for model training and model testing. The database 110 includes the attributes of data collections from one or more of a plurality of data types. Examples of data collection include advertisements 111, search query responses 112, photographs 113, movies 114, images 115, audio clips 116, video clips 117, other document products 118, or the like. Although an example of job advertisements is described in detail below, the methods described herein may be applied to other types of advertisements (other than jobs), and may be applied to other types of online documents (other than advertisements). For purpose of the examples described below, the model generation uses the document attributes, and inclusion of copies of the full documents themselves within database 110 is optional.

In one embodiment, training and testing data for job listings are taken from from HotJobs data. HotJobs is an online marketplace operated by Yahoo!, Inc. of Sunnyvale, Calif., that provides a platform to match job seekers and recruiters. Given a large number of jobs with their descriptions, query logs and job metrics, the exemplary method and system predict CTR and uses it as one of the many signals to show ranked search listings. When a job seeker searches for a keyword on a job portal, he or she is shown a number of job listings. This is called a view event. If the job seeker clicks on a job listing to view the description of the job, it is called a click event. CTR is computed as the ratio of click events to view events that happened for a job.

A processor 100 accesses the data in database 110 for generating the CTR model. Although FIG. 1 schematically shows the database 110 in direct communication with the processor 100, the database 110 may be remotely located and accessed via a network 120, which may be a local area network (LAN), a wide area network (WAN), or the Internet.

In some embodiments, processor 100 includes a single computer that generates the CTR model, computes CTR predictions, computes relative rankings of documents for determining page placement, and rendering ranked lists of documents to clients 130. In other embodiments, processor 100 may include a plurality of computers, each performing one or more of these tasks. In some embodiments processor 100 includes multiple co-located computers. In other embodiments, processor 100 comprises at least a first computer in a first location and at least a second computer in a second location, where the first and second computers communicate with each other via LAN, WAN or the Internet.

Figure 2:
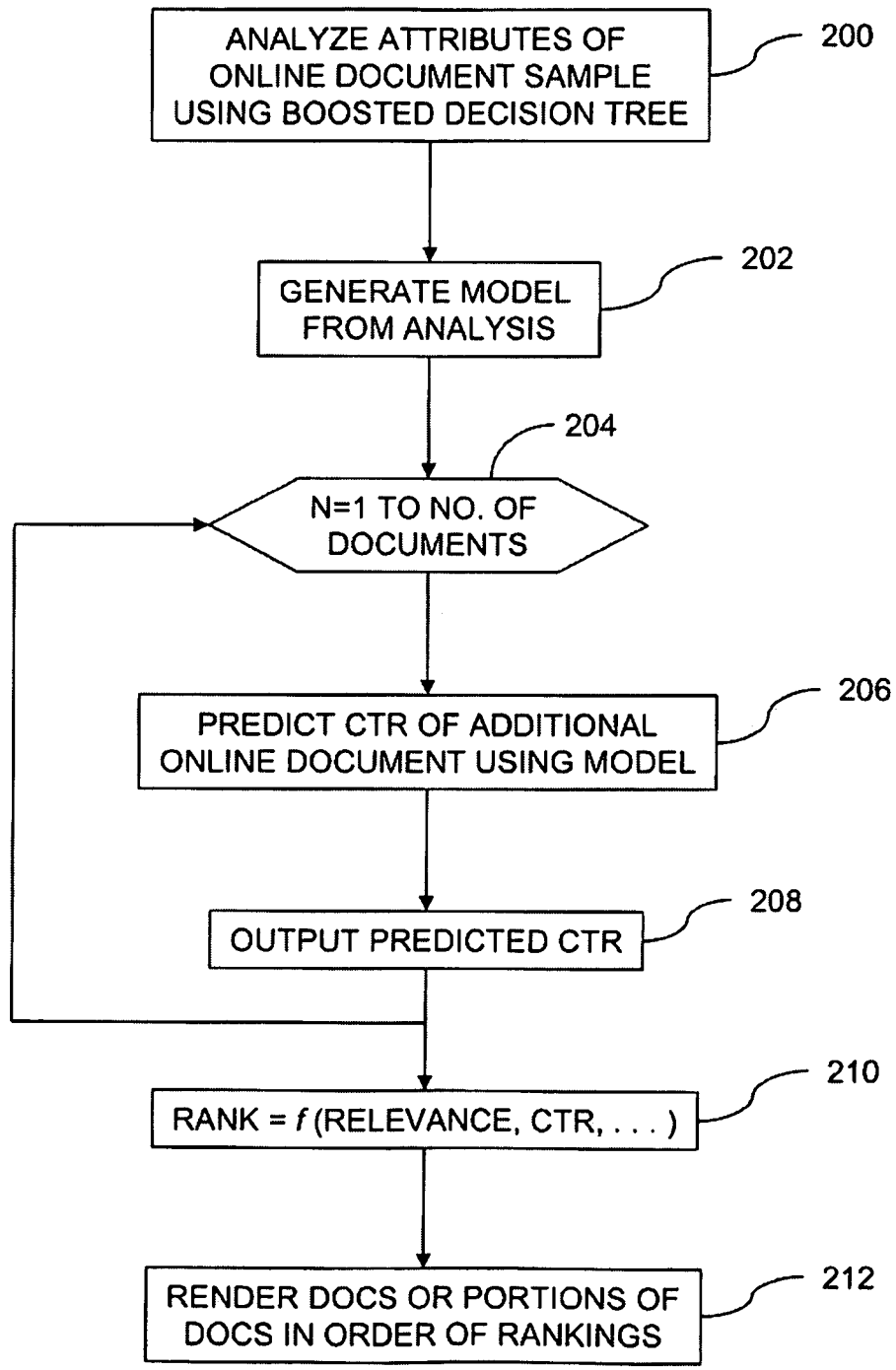
FIG. 2 is a flow chart of CTR prediction for an online document.

FIG. 2 is a flow chart of one example of a general computer implemented system and method of CTR prediction using a boosted decision tree technique.

At step 200, a plurality of attributes of a sample of online documents are analyzed using a boosted decision tree. The documents may be any types of documents, including but not limited to document types 111-118 shown in FIG. 1.

At step 202, a model is generated from the boosted decision tree

At step 204, a loop including steps 206 and 208 is performed for each of the documents to be ranked, so as to use the model to predict respective click through rates (CTR) of a plurality of additional online documents based on the analyzing.

At step 206, the system computes a predicted CTR of an additional online document based on the analyzing.

At step 208, the predicted CTR is output to a display device, storage medium or network.

At step 210, the respective predicted CTR of each of the plurality of additional online documents is used as an input factor for ranking the plurality of additional online documents. A variety of combinations of factors may be used. For example, the ranking may be determined by a weighted average of relevance and CTR.

At step 212, the additional online documents or portions thereof are rendered for display in order of their respective rankings.

Figure 3:
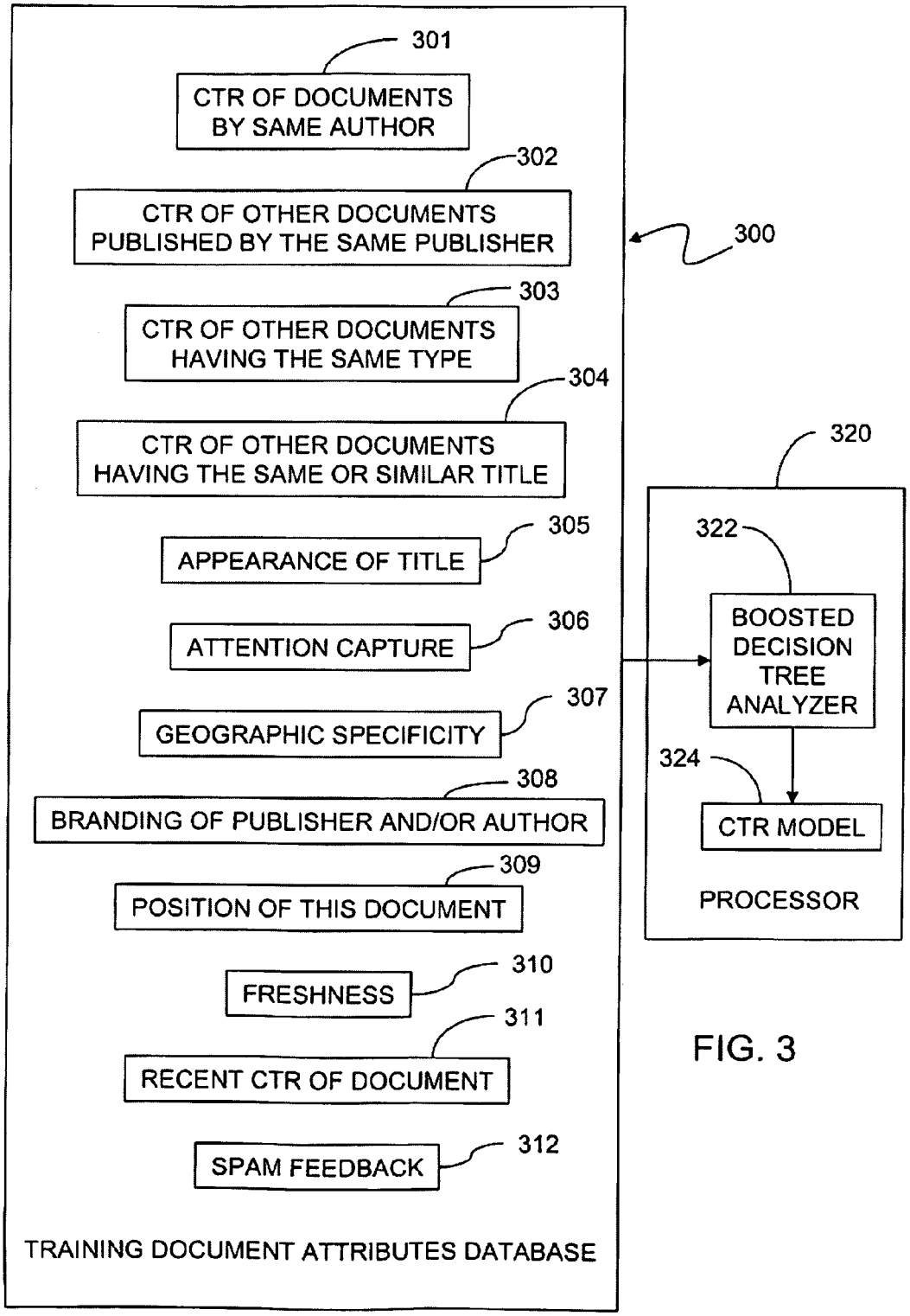
FIG. 3 is a block diagram of an embodiment for generating a CTR model for online documents.

FIG. 3 is a block diagram showing an example of a system for generating the model. The system includes a training document attributes database 300. The exemplary database includes general parameters relevant for a variety of document types:

CTR 301 of other documents by the same author as the additional online document;

CTR 302 of other documents published by the same publisher as the additional online document; higher weight may be accorded to CTR of documents by the same publisher that are part of the same series of documents as the additional online document.

CTR 303 of other documents having the same type as the additional online document;

CTR 304 of documents having the same or similar title.

Appearance 305 of the document title: Length, fonts, punctuation, use of popular words, or the like.

Attention Capture factors 306, such as inclusion of action words in the title.

Geographic specificity 307: Does the document have appeal limited to specific regions?

Branding 308 (of publisher or author). How much does the publisher typically spend promoting its publications and authors ? Does the author promote his/herself and his/her work?

Position 309 at which the job appears: CTR of a document listing decreases the further down the document appears in a search listing order.

Freshness 310 of the document. The age of the document since last updated. This factor may be given higher weight for some types of documents (e.g., political commentary and topical humor) than others.

Recent CTR history 311 (if this document has any history).

Spam feedback 312.

Block 322 is a boosted decision tree analyzer. Boosted decision trees combine the strengths of two algorithms: regression trees (models that relate a response to their predictors by recursive binary splits) and boosting (an adaptive method for combining many simple models to give improved predictive performance). A boosted decision tree is a regression technique and system combining predictions of a plurality of classifiers instead of a single classifier. Boosting is a technique for learning multiple decision tree classifiers, such that every decision tree classifier performs better than the previous one, and so excludes some of the mistakes that the previous one was making. Because it is not possible to use the entire universe of data to perform a regression, the plurality of classifiers are based on respectively different training data samples. The predictions of several locally accurate classifiers are then combined.

A tree can be "learned" by splitting the source sample into sub samples based on an attribute value test. This process is repeated on each derived subset in a recursive manner. The recursion is completed when splitting is either non-feasible, or a singular classification can be applied to each element of the derived sub sample.

Given one of the training data sample spaces 111-118 for which a boosted decision tree model is to be generated, the data sample space is divided into N sub samples. N-1 of the sub samples are used as the training data and the remaining sub sample is used as the test data. A classifier generated by a regression based on the N-1 training sub-samples is then tested against the remaining sub sample. These steps are repeated by selecting a different one of the N sub samples to be the test sub sample, and generating another classifier based on the remaining N-1 training data sub samples. After multiple iterations, several classifiers are learned, each one with a respectively different one of the sub samples left out, and reserved for testing data. The final prediction is the aggregate of the predictions of the individual classifiers.

In another variation, a plurality of N sample sets can be randomly selected from the training data sample space 111-118 for which a model is to be generated. A respective classifier is generated from each of the N sample sets. A "bagged" classifier then combines the CTR predictions of the N classifiers.

Boosting is an iterative technique allowing final prediction of the CTR by a combination of the prediction of several predictors. Each successive classifier depends on its predecessors. With each iteration, errors for the previous classifier are evaluated, and weights are adjusted to improve the accuracy of the prediction.

The final CTR value obtained is basically a weighted sum of the values obtained from the decision trees of each of the classifiers. The weights are proportional to the amount of confidence placed in each respective decision tree. Each decision tree can be evaluated against the test data to find out how accurately it predicts the test data. Finally each decision tree is weighted according to its performance against the test data.

In one example of a boosting algorithm, each of the training points is assigned a respective weight, W(x), such that $\Sigma W(x_i)=1$. Initially uniform weights are assigned $W_0(x)=1/N$ for all training points. At each iteration k, the best weak classifier $C_k(x)$ is found using weights wk(x). Given the error rate $\epsilon_k$ and based on a loss function, a respective weight $\alpha_k$ is determined for each of the classifiers $C_k$. For each training point $x_i$, the weights are updated based on the error $\epsilon_k$ to determine the updated weight for that data point, $W_{k+1}(x_i)$. The weighted classifier $C_f(x)=\Sigma \alpha_k C_i(x)$.

Block 324 is the CTR model using the classifier $C_f(x)$ generated by the boosted decision tree analyzer. The model can be used to predict the CTR of new documents. Further, the model can be updated over time by adding empirical data to the sample data space over time.

The inventors have discovered that the accuracy of the final value of the final predicted CTR obtained by boosted decision tree regression is substantially better than a CTR prediction obtained just using logistic regression.

FIG. 3 also shows block 320.

Figure 4:
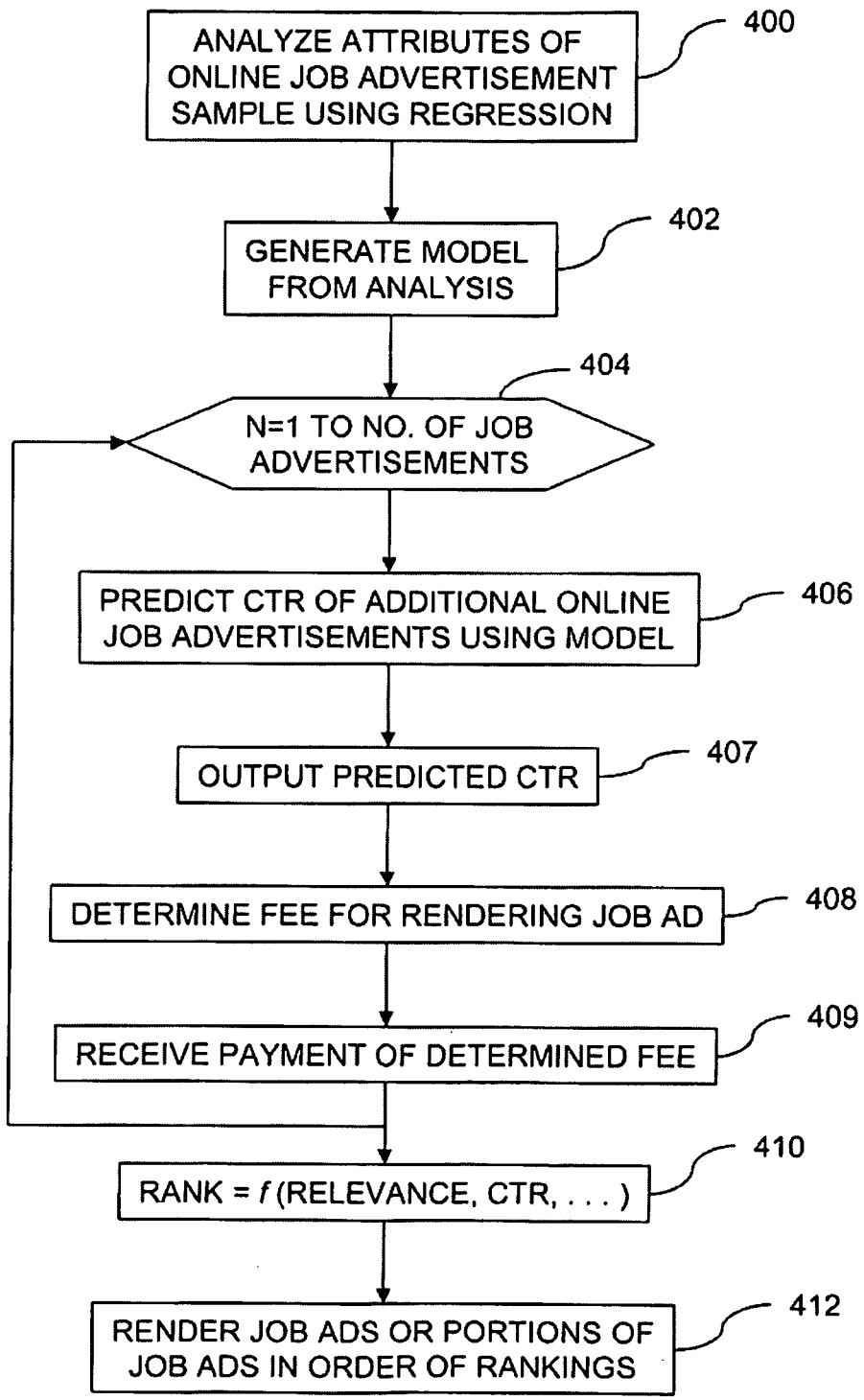
FIG. 4 is a flow chart of CTR prediction for an online job advertisement.

FIG. 4 is a detailed flow diagram of another example of a CTR prediction method and system specifically adapted for CTR of job advertisements.

At step 400 a plurality of attributes of a sample of online job advertisements are analyzed using a regression technique. The regression technique may be a boosted decision tree (as described above), or another regression technique, such as logistic regression, Bayesian classifiers and software vector machines (SVM).

At step 402, a model is generated from the regression.

At step 404, a loop including steps 406 and 408 is repeated for each of the job advertisements for which a CTR prediction is desired, thus using the model to predict respective click through rates (CTR) of a plurality of additional online job advertisements based on the analyzing.

At step 406, the model is used to predict a click through rate (CTR) of an additional online job advertisement based on the analyzing.

At step 407, the predicted CTR is output to a display device, storage medium or network.

At step 408, a fee for rendering the additional online job advertisement and/or the number of impressions to be rendered is determined based on the predicted CTR.

At step 409, a payment of the determined fee is received from the advertiser.

At step 410, the respective predicted CTR of each of the plurality of additional online job advertisements is used as an input factor for ranking the plurality of additional online job advertisements (i.e., for determining the position in which each of the job advertisements will appear in the output list of job advertisements). In some embodiments, the relevance and CTR are used as the most highly weighted factors in the scoring of each job advertisement for determining placement, with various other factors being assigned smaller weights or zero weight.

At step 412, the processor renders the additional online job advertisements for display in order of their respective rankings in response to an online job query.

Figure 5:
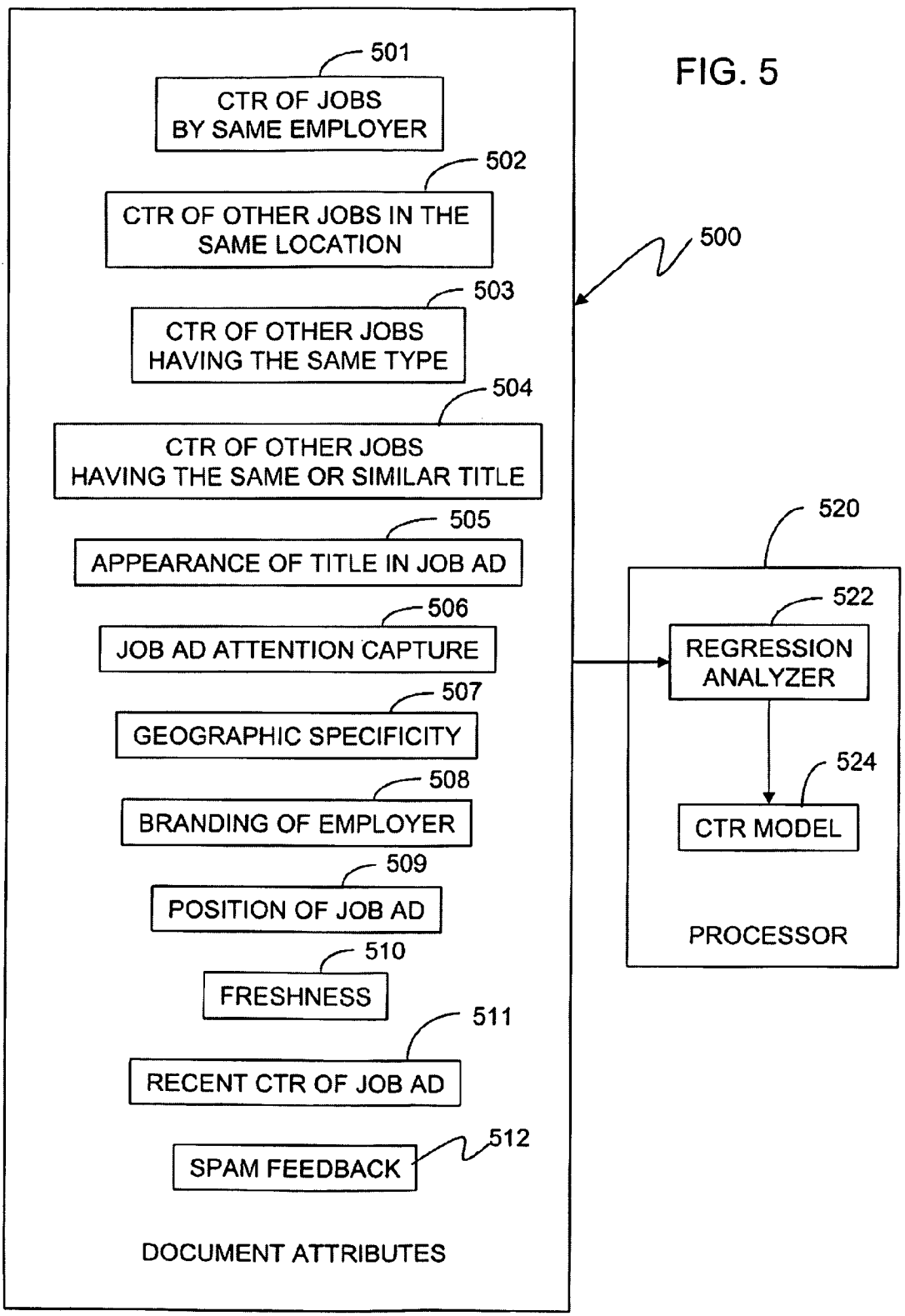
FIG. 5 is a block diagram of an embodiment for generating a CTR model for online job advertisements.

FIG. 5 is a block diagram showing the job advertisement attribute inputs 500 to the regression model 522, 524.

As shown in FIG. 5, attributes 500 include the following: CTR of jobs by same employer 501, CTR of other jobs in the same location 502, CTR of other jobs having the same type 503, CTR of other jobs having the same or similar title 504, appearance of title in job ad 505, job ad attention capture 506, geographic specificity 507, branding of employer 508, position of job ad 509, freshness 510, recent CTR of job ad 511, and spam feedback 512.

FIG. 5 also shows block 520.

The inventors have discovered an effective set of 12 input features for use in CTR prediction for job advertisements.

1. A number of attributes characterize the similarity of jobs, including CTR of jobs with same title 504, CTR of jobs from same employer or company 501, CTR of jobs from same or proximate location 502, CTR of jobs from same category 503. To compute the above features, the time period of observation may be varied. For example, in one six different features are based on "CTR of jobs with same title posted in past 1/2/3 weeks and based on click day of past 1/2/3 weeks".

Figure 6:
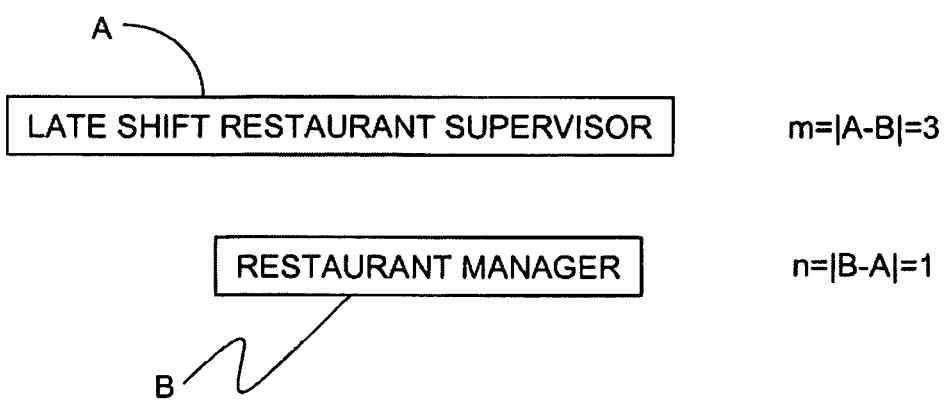
FIG. 6 is a diagram of job difference set cardinality determination.

2. CTR 504 of jobs with related titles: i.e., jobs having titles which are related to the tile of the job advertisement for which the CTR prediction is desired. In some embodiments, similarity of any two documents is determined by cardinality of a difference set that includes non-overlapping terms included in the title of one of the two documents but not included in the title of the other of the two documents. Two sets of words are related if their intersection is non-null and the cardinality of the difference set is less than a threshold value (e.g., less than 5). Let current job title be represented by set A and any other job title by set B. Consider average CTR_mn of related jobs with m=|A−B| and n=|B−A| and number of related_mn jobs where both m and n can vary from 0 to 4 as features. This is computed for jobs over a predetermined duration (e.g., the past 1 week/2 weeks). An example is provide by FIG. 6, which shows the job titles A ("late shift restaurant supervisor") and B ("restaurant manager.") The cardinality of the difference set m is 3 and the cardinality of the difference set n is 1.

3. Appearance of the job title. Features may include: Number of words in the title. Does the job title have all words starting with a capital letter? Is the job title written totally in capitals? Does it contain too many exclamation points, dollar signs, or other punctuation (>10% of title length)? Percentage of long words?(words with word-size >10). Does the title provide numbers (such as salary)? In one embodiment, the vocabulary of words are divided into 10 bins depending on the popularity of words. This provides 10 features—the number of words in the job title that fall in each of the 10 bins.

4. Attention Capture: Does the title contain action/high-marketing-pitch words such as "apply", "earn", "home", "wanted", "needed" etc.?

5. Job description page quality: Does the page contain html? Does the page contain images? What is the average size of the description page for that company?

6. Location Specificity: Does the job mention multiple job locations or a single one?

7. Brand value of the company: Market capitalization, average employee salary, ranking of the company provided by external sources like best-companies list, fortune-fastest-growing-list, fortune-500 list, most-admired-list, best-companies-to-work-for-list; Employee strength 8. Position at which the job appears: The CTR of a job listing goes on decreasing as the ad is located further down the search listing order. During the regression analysis, the impact of the listing position is evaluated based on the training data, which include ads placed in a variety of positions in the search results page.

9. Category of the job: In some embodiments, jobs are classified into several (e.g., 30) categories. The CTR varies with the category of the job.

10. Freshness Feature: Age of the job (measured as the difference of current date and creation date of the job), days since last updated.

11. CTR for the job if it already existed in the system, x days back, 0<x<11.

12. Spam feedback: Number of signed-in user abuse votes against the job.

In some embodiments, the feature set may be pruned. For jobs which have some history, the features based on CTR of past x days (0<x<11) may be weighted more heavily. For jobs without any history, appearance of title and similarity features may be weighted more heavily.

EXAMPLE

The inventors built a CTR model using 21 days (average shelf-life of a job) of data for all computations. Training data were provided for about 40,000 jobs by considering click data from February 16 to March 7 and predicted CTR of March 8. 80% of the data were used for training and 20% were used for validation. The CTR was estimated using regression. The problem was treated as a classification problem by dividing the range between 0 to 1 into 1000 parts (to achieve a 3 point precision in the predicted CTR).

The methods and systems described herein can be extended to other applications by choosing an appropriate set of features and learning models using logs from respective domains. As times change, different locations become less attractive for jobs, different categories become more popular and so on. Factors change and models will start drifting. Depending on the costs of acquisition of feature values and time required to build the training model, we can decide the frequency of updates of the model.

The model can be used to predict CTR as well as suggest norms to be followed to write good job listings (or other documents). For example, a plurality of versions of a document (e.g., job listing) may be input to the model to compute respective CTR values for each version. The system can automatically rank the versions by CTR and output an identification of the version having the best CTR. Alternatively, a user can interactively make changes to the job listing document and input the document to the system for a CTR calculation. With each change, the system outputs "before and after" CTR values the user can examine to determine whether to keep the latest change or back it out to use the previous version.

The present invention may be embodied in the form of computer-implemented processes and apparatus for practicing those processes. The present invention may also be embodied in the form of computer program code embodied in tangible machine readable storage media, such as random access memory (RAM), floppy diskettes, read only memories (ROMs), CD-ROMs, hard disk drives, flash memories, or any other machine-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, such that, when the computer program code is loaded into and executed by a computer, the computer becomes an apparatus for practicing the invention. When implemented on a general-purpose processor, the computer program code segments configure the processor to create specific logic circuits. The invention may alternatively be embodied in a digital signal processor formed of application specific integrated circuits for performing a method according to the principles of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer implemented method comprising:
analyzing a plurality of attributes of a sample of online documents using a boosted decision tree and generating a machine learning model therefrom;
using the machine learning model to predict a click through rate (CTR) of an additional online document based on the analyzing;
outputting the predicted CTR to a display device, storage medium or network,
wherein the plurality of attributes include a CTR of other documents having titles that are the same as or similar to a title of the additional online document;
determining similarity of any two documents by cardinality of a difference set that includes non-overlapping terms included in the title of one of the two documents but not included in the title of the other of the two documents;
using the machine learning model to predict respective CTR of a plurality of additional online documents based on the analyzing; and
ranking the plurality of additional online documents by using the respective predicted CTR of each of the plurality of additional online documents as an input factor.

2. The method of claim 1, further comprising:
rendering the additional online documents or portions thereof for display in order of their respective rankings.

3. The method of claim 1, wherein the additional online document is one of the group consisting of an advertisement, a response to a search query, a photograph, a movie, an image, an audio clip, a video clip and a commercial document product.

4. The method of claim 1, wherein the plurality of attributes include at least one of the group consisting of CTR of other documents by the same author as the additional online document, CTR of other documents published by the same publisher of the additional online document, and CTR of other documents having the same type as the additional online document.

5. The method of claim 1, wherein the plurality of attributes includes a measure indicating an amount of spam feedback received relating to the document.

6. A system comprising:
a machine readable storage medium storing a sample of online documents; and
a processor configured to analyze a plurality of attributes of the sample of online documents using a boosted decision tree and generating a model therefrom;
the processor configured to use the model to predict a click through rate (CTR) of an additional online document based on the analyzing;
the processor configured to output the predicted CTR to a display device, storage medium or network,
wherein the plurality of attributes include a CTR of other documents having titles that are the same as or similar to a title of the additional online document;
the processor configured to determine similarity of any two documents by cardinality of a difference set that includes non-overlapping terms included in the title of one of the two documents but not included in the title of the other of the two documents;

the processor configured to use the model to predict respective CTR of a plurality of additional online documents based on the analyzing; and the processor configured to rank the plurality of additional online documents by using the respective predicted CTR of each of the plurality of additional online documents as an input factor.

7. The system of claim 6, wherein:

the processor is configured to render the additional online documents or portions thereof for display in order of their respective rankings.

8. The system of claim 6, wherein the plurality of attributes include at least one of the group consisting of CTR of other documents by the same author as the additional online document, CTR of other documents published by the same publisher of the additional online document, and CTR of other documents having the same type as the additional online document.

9. A machine readable storage medium encoded with computer program code, wherein when the computer program code is executed by a processor, the processor performs a machine implemented method comprising the steps of:

analyzing a plurality of attributes of a sample of online documents using a boosted decision tree and generating a model therefrom;

using the model to predict a click through rate (CTR) of an additional online document based on the analyzing;

outputting the predicted CTR to a display device, storage medium or network, wherein the plurality of attributes include a CTR of other documents having titles that are the same as or similar to a title of the additional online document;

determining similarity of any two documents by cardinality of a difference set that includes non-overlapping terms included in the title of one of the two documents but not included in the title of the other of the two documents;

using the model to predict respective CTR of a plurality of additional online documents based on the analyzing; and ranking the plurality of additional online documents by using the respective predicted CTR of each of the plurality of additional online documents as an input factor.

10. The machine readable storage medium of claim 9, further comprising:

rendering the additional online documents or portions thereof for display in order of their respective rankings.

11. The machine readable storage medium of claim 9, wherein the plurality of attributes include at least one of the group consisting of CTR of other documents by the same author as the additional online document, CTR of other documents published by the same publisher of the additional online document, and CTR of other documents having the same type as the additional online document.

* * * * *